United States Patent
Koizumi

(10) Patent No.: US 9,113,123 B2
(45) Date of Patent: Aug. 18, 2015

(54) ELECTRONIC APPARATUS, CONTROL METHOD, AND RECORDING MEDIUM

(75) Inventor: Hidetaka Koizumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/597,116

(22) Filed: Aug. 28, 2012

(65) Prior Publication Data

US 2013/0057771 A1 Mar. 7, 2013

(30) Foreign Application Priority Data

Sep. 1, 2011 (JP) ................................ 2011-190376

(51) Int. Cl.
| | |
|---|---|
| *G06F 3/00* | (2006.01) |
| *G06F 13/00* | (2006.01) |
| *G06F 12/00* | (2006.01) |
| *H04N 5/765* | (2006.01) |
| *H04N 21/41* | (2011.01) |
| *H04N 21/4363* | (2011.01) |
| *H04L 29/12* | (2006.01) |

(52) U.S. Cl.
CPC ............ *H04N 5/765* (2013.01); *H04L 61/2038* (2013.01); *H04N 21/4108* (2013.01); *H04N 21/43635* (2013.01); *H04L 61/103* (2013.01)

(58) Field of Classification Search
None
See application file for complete search history.

(56) References Cited

U.S. PATENT DOCUMENTS

| | | | | |
|---|---|---|---|---|
| 8,214,555 | B2* | 7/2012 | Suga ................................ | 710/33 |
| 8,286,210 | B2* | 10/2012 | Boyden et al. .................. | 725/80 |
| 8,356,121 | B2* | 1/2013 | Suga ................................ | 710/15 |
| 8,711,285 | B2* | 4/2014 | Yoshida et al. ............... | 348/552 |
| 8,966,566 | B2* | 2/2015 | Toba ............................. | 725/118 |
| 2006/0036775 | A1* | 2/2006 | Levit-Gurevich ................ | 710/1 |
| 2007/0088930 | A1* | 4/2007 | Matsuda et al. ............. | 711/170 |
| 2008/0080021 | A1* | 4/2008 | Ohkita ......................... | 358/479 |
| 2008/0270636 | A1* | 10/2008 | Hong et al. ...................... | 710/9 |
| 2008/0297371 | A1* | 12/2008 | Ida .......................... | 340/825.52 |
| 2008/0320539 | A1* | 12/2008 | Ohkita ......................... | 725/118 |
| 2009/0049205 | A1* | 2/2009 | Park ................................. | 710/4 |
| 2009/0077492 | A1* | 3/2009 | Ida ............................... | 715/810 |
| 2009/0207307 | A1* | 8/2009 | Tsuru et al. ................... | 348/554 |
| 2009/0237571 | A1* | 9/2009 | Horimoto et al. ............. | 348/725 |
| 2009/0268100 | A1* | 10/2009 | Suga ............................ | 348/705 |
| 2009/0327474 | A1* | 12/2009 | Ida ............................... | 709/223 |
| 2011/0066759 | A1* | 3/2011 | Kikkawa et al. ................. | 710/3 |
| 2013/0215833 | A1* | 8/2013 | Ong et al. ..................... | 370/329 |

FOREIGN PATENT DOCUMENTS

JP 2010-28444 A 2/2010

* cited by examiner

*Primary Examiner* — Michael Sun
(74) *Attorney, Agent, or Firm* — Canon U.S.A., Inc. IP Division

(57) ABSTRACT

A communication apparatus includes a communication unit that outputs a predetermined request for acquiring a predetermined logical address acquired by an external apparatus to the external apparatus, and a control unit that controls the communication unit to transmit a command using the predetermined logical address acquired from the external apparatus, wherein the predetermined logical address is related to a device type of the communication apparatus.

15 Claims, 8 Drawing Sheets

FIG.3

| LOGICAL ADDRESS | DEVICE TYPE |
|---|---|
| 0 | TV |
| 1 | Recording Device1 |
| 2 | Recording Device2 |
| 3 | Tuner1 |
| 4 | Playback Device1 |
| 5 | Audio System |
| 6 | Tuner2 |
| 7 | Tuner3 |
| 8 | PlaybackDevice2 |
| 9 | Recording Device3 |
| 10 | Tuner3 |
| 11 | PlaybackDevice3 |
| 12 | Reserved |
| 13 | Reserved |
| 14 | Free Use |
| 15 | Unregistered (initiator) |
| 15 | Broadcast (destination) |

ELECTRONIC APPARATUS, CONTROL METHOD, AND RECORDING MEDIUM

BACKGROUND OF THE INVENTION

1. Field of the Invention

The present invention relates to an electronic apparatus capable of communicating with an external apparatus, a control method, and a recording medium.

2. Description of the Related Art

A communication interface referred to as a high-definition multimedia interface (HDMI) (registered trademark) has been discussed. A system which connects a source apparatus in conformity to an HDMI standard with a sink apparatus in conformity to the HDMI standard has been known as a communication system conforming to the HDMI standard (hereinbelow referred to as a "HDMI system").

Japanese Patent Application Laid-Open No. 2010-28444 discusses a source apparatus that transmits a command for controlling a sink apparatus to the sink apparatus using a consumer electronics control (CEC) protocol if the HDMI system can acquire a logical address.

If the HDMI system cannot acquire the logical address, however, such a source apparatus can neither transmit the command for controlling the sink apparatus to the sink apparatus using the CEC protocol, nor receive a command for controlling the source apparatus from the sink apparatus.

For this reason, neither the sink apparatus can be controlled using the source apparatus that has not yet acquired the logical address, nor the source apparatus that has not yet acquired the logical address can be controlled using the sink apparatus.

Thus, if a user views video data recorded in the source apparatus that has not yet acquired the logical address by the sink apparatus, the user needs to perform an operation for viewing on the source apparatus that has not yet acquired the logical address and the sink apparatus. That is inconvenient for the user.

SUMMARY OF THE INVENTION

An aspect of the present invention relates to a technique for enabling a source apparatus to acquire an appropriate logical address.

According to an aspect of the present invention, a communication apparatus includes a communication unit that outputs a predetermined request for acquiring a predetermined logical address acquired by an external apparatus to the external apparatus, and a control unit that controls the communication unit to transmit a command using the predetermined logical address acquired from the external apparatus, wherein the predetermined logical address is related to a device type of the communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table indicating a corresponding relationship between a device type of an electronic apparatus and a logical address according to the first exemplary embodiment.

DESCRIPTION OF THE EMBODIMENTS

Various exemplary embodiments, features, and aspects of the invention will be described in detail below with reference to the drawings.

Figure 1:
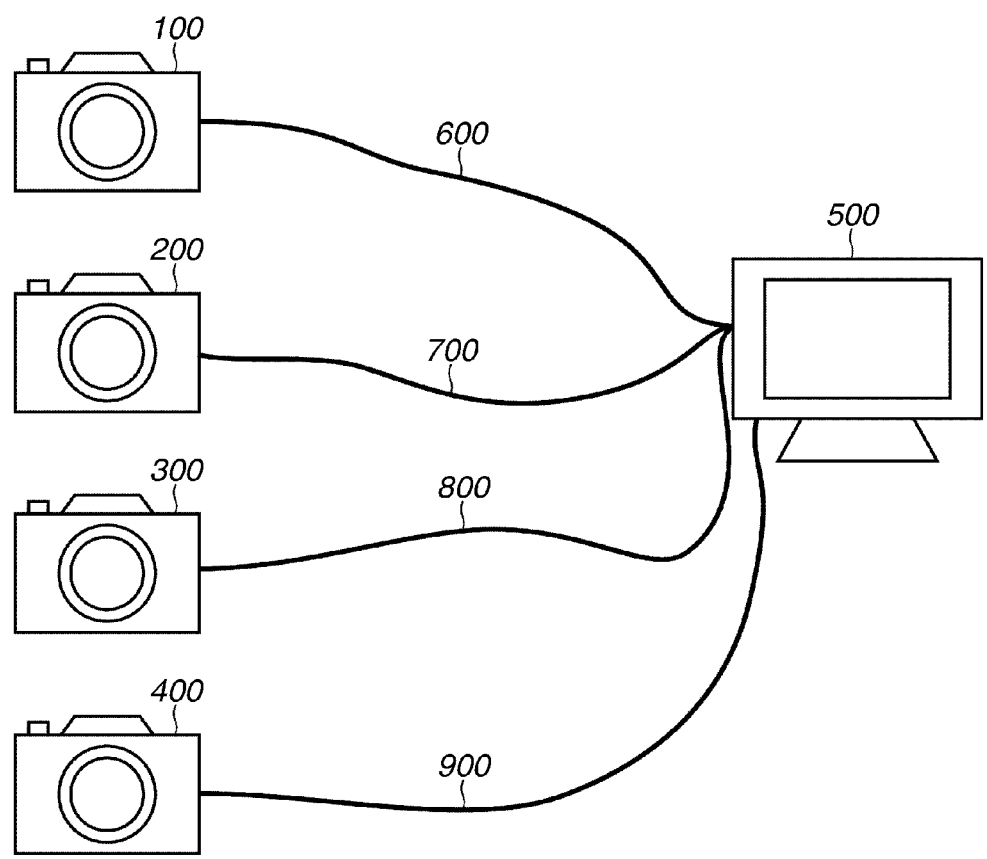
FIG. 1 is a schematic diagram illustrating an example of a communication system according to a first exemplary embodiment.

FIG. 1 is a block diagram related to a first exemplary embodiment of the present invention.

Figure 2:
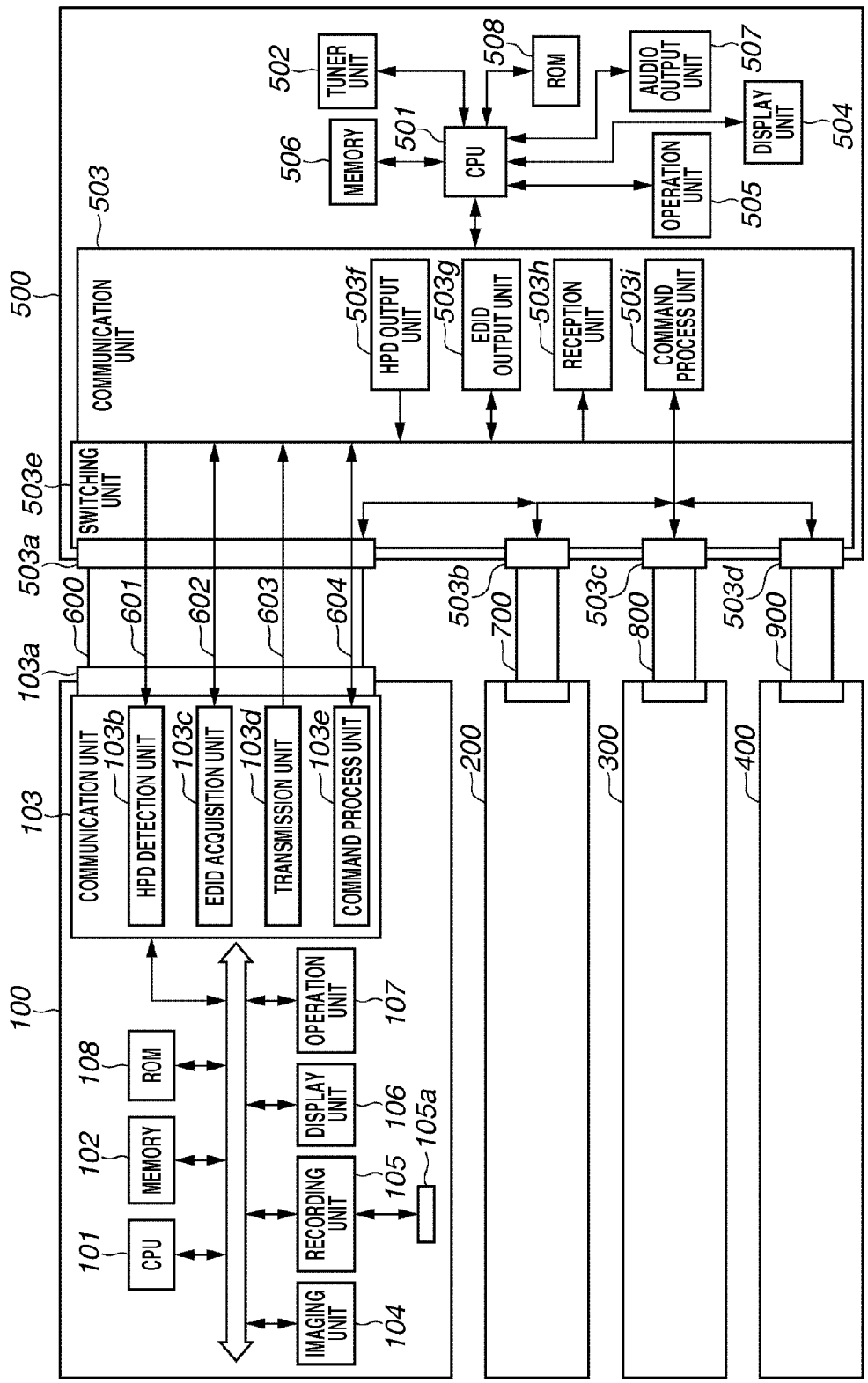
FIG. 2 is a block diagram illustrating an example of the communication system according to the first exemplary embodiment.

As illustrated in FIGS. 1 and 2, a communication system according to the first exemplary embodiment includes electronic apparatuses 100, 200, 300, and 400, an output apparatus 500, and connection cables 600, 700, 800 and 900.

The electronic apparatuses 100, 200, 300, and 400 are connected with the output apparatus 500 via the connection cables 600, 700, 800, and 900 respectively.

The electronic apparatuses 100, 200, 300, and 400 are transmission apparatuses capable of transmitting video data, audio data, and auxiliary data to the output apparatus 500. The output apparatus 500 is a display apparatus for displaying the video data received from any one of the electronic apparatuses 100, 200, 300, and 400 on a display device. The output apparatus 500 may be an audio output apparatus for outputting the audio data received from any one of the electronic apparatuses 100, 200, 300, and 400 from a speaker.

The electronic apparatus 100 transmits a control command to the output apparatus 500 via the connection cable 600 and receives the control command from the output apparatus 500 via the connection cable 600. The electronic apparatus 100 can transmit the control command to at least one of the electronic apparatuses 200, 300, and 400 via the connection cable 600 and the output apparatus 500. The electronic apparatus 100 can receive the control command from at least one of the electronic apparatuses 200, 300, and 400 via the connection cable 600 and the output apparatus 500. The electronic apparatuses 200, 300, and 400 can also receive and transmit the control command similarly to the electronic apparatus 100.

In the first exemplary embodiment, the electronic apparatuses 100, 200, 300, and 400 are regarded as conforming to a high-definition multimedia interface (HDMI) standard. The connection cables 600, 700, 800 and 900 are regarded as conforming to the HDMI standard. The output apparatus 500 is regarded as conforming to the HDMI standard.

Therefore, the electronic apparatuses 100, 200, 300, and 400 can be regarded as source apparatuses functioning as a HDMI source in the HDMI standard. The output apparatus 500 can be regarded as a sink apparatus functioning as a HDMI sink in the HDMI standard.

In the first exemplary embodiment, the electronic apparatuses 100, 200, 300, and 400 and the output apparatus 500 are regarded as conforming to a consumer electronics control (CEC) protocol defined by the HDMI standard. In the communication system illustrated in FIG. 1, the control command used by the electronic apparatuses 100, 200, 300, and 400 and the output apparatus 500 conforms to the CEC protocol. Hereinbelow, the control command conforming to the CEC protocol is referred to as a "CEC command". The CEC command includes a command to be transmitted to one electronic apparatus and a command to be transmitted to all electronic apparatuses conforming to the CEC protocol. Hereinbelow, the command to be transmitted to all electronic apparatuses conforming to the CEC protocol is referred to as a "broadcast command".

In the first exemplary embodiment, a digital still camera is used as an example of the electronic apparatuses 100, 200, 300, and 400. The electronic apparatuses 100, 200, 300, and 400 are not limited to the digital still camera, and may be a recording apparatus such as a digital single lens reflex camera, a digital video camera, a cellular phone, and a recorder provided that it is an electronic apparatus with a function as the HDMI source. Further, the electronic apparatuses 100, 200, 300, and 400 may be a reproduction apparatus such as a digital versatile disc (DVD) player or an audio player.

In the first exemplary embodiment, a television receiving apparatus (herein after referred to as a "television") is used as an example of the output apparatus 500. The output apparatus 500 is not limited to the television, and may be a display apparatus such as a projector or a personal computer provided that it is an electronic apparatus with a function as the HDMI sink. The connection cables 600, 700, 800 and 900 are not limited to an HDMI cable, but may be an interface with interchangeability with the HDMI standard. The connection cables 600, 700, 800 and 900 may be the ones through which communication conforming to the HDMI standard is performed by wireless communication.

Hereinbelow, the electronic apparatuses 100, 200, 300, and 400 are referred to as camera 100, camera 200, camera 300, and camera 400 respectively. The connection cables 600, 700, 800 and 900 are referred to as HDMI cable 600, HDMI cable 700, HDMI cable 800, and HDMI cable 900 respectively. The output apparatus 500 is referred to as a television 500.

The HDMI cable 600 is described below with reference to FIG. 2.

The HDMI cable 600 includes a power line (not illustrated), a hot plug detect (HPD) line 601, and a display data channel (DDC) line 602. The HDMI cable 600 also includes a transition minimized differential signaling (TMDS) line 603 and a CEC line 604.

The power line (not illustrated) is a power supply line for supplying a predetermined power to the television 500 from the camera 100. The HPD line 601 is a transmission line for transmitting an HPD signal whose voltage is high (hereinbelow referred to as an H level) or whose voltage is low (hereinbelow referred to as an L level) to the camera 100 from the television 500. The DDC line 602 is a transmission line for transmitting device information of the television 500 to the camera 100 from the television 500. The device information of the television 500 refers to extended display identification data (EDID) of the television 500 or enhanced EDID (E-EDID).

Both of the EDID and the E-EDID include identification information of the television 500, information about display capacity of the television 500, and a physical address as information indicating a connection terminal of the television 500, as the device information of the television 500. The EDID and the E-EDID include information about resolution, a scanning frequency, an aspect ratio, and a color space supported by the television 500, for example. The E-EDID is the one in which the EDID is extended and includes a larger amount of capacity information than the EDID. The E-EDID includes information about a format of video data and audio data supported by the television 500, for example. Hereinbelow, both of the EDID and the E-EDID are referred to as "EDID".

The TMDS line 603 is a transmission line for transmitting video data, audio data, and auxiliary data to the television 500 from the camera 100.

The CEC line 604 is a transmission line for bidirectionally transferring various CEC commands between the camera 100 and the television 500. The television 500 can control the camera 100 by transmitting the CEC command for controlling the camera 100 to the camera 100 via the CEC line 604.

The HDMI cables 700, 800, and 900 are similar in configuration to the HDMI cable 600.

An example of a configuration of the camera 100 is described below with reference to FIG. 2. As illustrated in FIG. 2, the camera 100 includes a central processing unit (CPU) 101, a memory 102, a communication unit 103, an imaging unit 104, a recording unit 105, a display unit 106, an operation unit 107, and a read only memory (ROM) 108. The camera 100 is described below.

The CPU 101 controls the camera 100. The CPU 101 controls the camera 100 according to the CEC command received via the CEC line 604 and an input signal from the operation unit 107. Further, the CPU 101 analyzes the EDID of the television 500 acquired from the television 500 and records the analyzed result in the memory 102 along with the acquired EDID.

The memory 102 functions as a buffer of the camera 100 and is capable of temporarily recording the video data and the audio data read by the recording unit 105.

The memory 102 also records the analyzed result of the EDID by the CPU 101 and the physical address included in the EDID of the television 500. The physical address recorded in the memory 102 is information indicating the communication path of the camera 100 in the communication system illustrated in FIG. 1. The physical address is specified in the HDMI standard. The physical address is information about the connection terminal of the television 500 with which the camera 100 is connected via the HDMI cable 600, for example. The memory 102 is not limited to a random access memory (RAM), but may be an external storage device such as a hard disk device.

The communication unit 103 includes a connection terminal 103a, an HPD detection unit 103b, an EDID acquisition unit 103c, a transmission unit 103d, and a command process unit 103e.

The connection terminal 103a is a terminal for connecting the HDMI cable 600.

The HPD detection unit 103b detects an HPD signal supplied from the television 500 via the connection terminal 103a and the HPD line 601. If the camera 100 supplies a predetermined power to the television 500 via a power line (not illustrated), the television 500 transmits the H level of HPD signal or the L level of HPD signal to the camera 100 according to whether the television 500 can transmit the EDID of the television 500 to the camera 100. If the television 500 can transmit the EDID of the television 500 to the camera 100, the television 500 transmits the H level of HPD signal to the camera 100 via the HPD line 601. If the HPD detection unit 103b detects the H level of HPD signal, the HPD detection unit 103b notifies the CPU 101 that the EDID of the television 500 can be acquired from the television 500.

If the camera 100 does not supply the predetermined power to the television 500, the television 500 transmits the L level of HPD signal to the camera 100 via the HPD line 601. If the television 500 cannot transmit the EDID of the television 500 to the camera 100, similarly, the television 500 transmits the L level of HPD signal to the camera 100 via the HPD line 601. If the HPD detection unit 103b detects the L level of HPD signal, the HPD detection unit 103b notifies the CPU 101 that the EDID of the television 500 cannot be acquired from the television 500.

If the HPD signal detected by the HPD detection unit 103b is in the H level, the EDID acquisition unit 103c transmits a request for acquiring the EDID of the television 500 to the television 500 via the connection terminal 103a and the DDC line 602 and acquires the EDID of the television 500. If the HPD signal detected by the HPD detection unit 103b is in the L level, the EDID acquisition unit 103c does not transmit a request for acquiring the EDID of the television 500 to the television 500 via the DDC line 602 and does not acquire the EDID of the television 500.

The transmission unit 103d transmits video data generated by the imaging unit 104 and read by the recording unit 105 from a recording medium 105a to the television 500 via the connection terminal 103a and the TMDS line 603. The transmission unit 103d also transmits audio data generated by a microphone unit (not illustrated) and read by the recording unit 105 from the recording medium 105a to the television 500 via the connection terminal 103a and the TMDS line 603. The transmission unit 103d further transmits auxiliary data for displaying the video data on the television 500 and for outputting the audio data from the speaker of the television 500 to the television 500 via the connection terminal 103a and the TMDS line 603.

The command process unit 103e receives the CEC command transmitted from the television 500 via the connection terminal 103a and the CEC line 604 from the television 500 and supplies the received CEC command to the CPU 101. The CPU 101 controls the camera 100 according to the CEC command supplied from the command process unit 103e.

The command process unit 103e transmits the CEC command for controlling the television 500 and a broadcast command to the television 500 via the connection terminal 103a and the CEC line 604. The CEC command for controlling the television 500 and the broadcast command are generated by the CPU 101. If the command process unit 103e transmits the CEC command for controlling the television 500 to the television 500 via the CEC line 604, the command process unit 103e receives a response to the camera 100 supplied from the television 500. The response from the television 500 to the camera 100 includes positive and negative responses. If the command process unit 103e transmits the CEC command to the television 500, the television 500 supplies the positive or the negative response to the camera 100 via the CEC line 604 according to the CEC command transmitted from the camera 100 to the television 500.

The communication unit 103 generates a predetermined power from a power supply unit (not illustrated) of the camera 100 and supplies the predetermined power to the television 500 via the connection terminal 103a and a power line (not illustrated).

If the camera 100 is in an image capturing mode, the imaging unit 104 captures an object and generates video data from the optical image of the object. The imaging unit 104 includes an image sensor such as a charge coupled device (CCD) for capturing an object. The video data to be generated in the imaging unit 104 may be any of moving image data or still image data. The video data generated in the imaging unit 104 are supplied to the transmission unit 103d and the recording unit 105 from the imaging unit 104. If the EDID acquisition unit 103c receives the EDID of the television 500 from the television 500, the imaging unit 104 converts the video data supplied to the transmission unit 103d from the imaging unit 104 into video data adapted to the display capacity of the television 500.

If the imaging unit 104 generates moving image data, the microphone unit (not illustrated) generates audio data. The audio data generated by the microphone unit are supplied to the transmission unit 103d, the recording unit 105, and a speaker unit (not illustrated). If the EDID of the television 500 can be received from the television 500, the microphone unit converts the audio data supplied to the transmission unit 103d from the microphone unit into the audio data adapted to audio capacity of the television 500. The audio data supplied to the transmission unit 103d from the microphone unit are transmitted to the television 500 via the TMDS line 603. The audio data supplied to the recording unit 105 from the microphone unit are recorded in the recording medium 105a. If the camera 100 is in a reproduction mode, the imaging unit 104 stops capturing an object to stop generating video data from the optical image of the object.

If an operation mode of the camera 100 is an image capturing mode, the recording unit 105 records the video data generated in the imaging unit 104 and the audio data generated in the microphone unit into the recording medium 105a. Recording the video data and the audio data generated in the imaging unit 104 and the microphone unit into the recording medium 105a is controlled by the CPU 101 in accordance with a user's instruction input via the operation unit 107. The CPU 101 can also control recording the video data and the audio data generated in the imaging unit 104 and the microphone unit into the recording medium 105a in accordance with the CEC command received from the television 500.

If the operation mode of the camera 100 is a reproduction mode, the recording unit 105 reads the video data and the audio data recorded in the recording medium 105a and supplies the video data and the audio data to the transmission unit 103d and the display unit 106. The video data recorded in the recording medium 105a by the recording unit 105 may be the video data generated by the imaging unit 104. If the operation mode of the camera 100 is the image capturing mode, the recording unit 105 stops reading of the video data and the audio data.

The recording medium 105a may be a recording medium that is built in the camera 100 or detachable therefrom. The recording medium 105a may be a hard disk drive, a memory card, or the like.

The display unit 106 may include a display such as a liquid crystal display. The display unit 106 displays any one of the video data generated in the imaging unit 104 or the video data read from the recording medium 105a.

The operation unit 107 provides a user interface for operating the camera 100. The operation unit 107 includes a plurality of buttons for operating the camera 100. Each button included in the operation unit 107 may be constituted of a switch, a touch panel, or the like.

The ROM 108 stores a computer program for controlling the camera 100 executed by the CPU 101. The ROM 108 also stores thresholds related to a process and an operation performed by the camera 100 and parameters related to a process and an operation performed by the camera 100. The ROM 108 also stores identification information indicating a manufacturer's name, a product name, and a manufacturing date of the camera 100.

In FIG. 2, although the configuration of the cameras 200, 300, and 400 is not illustrated, the cameras 200, 300, and 400 are similar in configuration to the camera 100 and perform a process and an operation similar to those of the camera 100. Thus, the descriptions of the configuration, process, and operation of the cameras 200, 300, and 400 are omitted.

An example of a configuration of the television 500 is described below with reference to FIG. 2.

As illustrated in FIG. 2, the television 500 includes a CPU 501, a tuner unit 502, a communication unit 503, a display unit 504, an operation unit 505, a memory 506, an audio output unit 507, and a ROM 508.

The CPU 501 controls the television 500 according to the computer program stored in the ROM 508.

The tuner unit 502 receives a television broadcasting program of a television channel selected by the user. The television channel is selected using the operation unit 505 or a remote controller (not illustrated).

The communication unit 503 includes connection terminals 503a, 503b, 503c, and 503d, a switching unit 503e, an HPD output unit 503f, an EDID output unit 503g, a reception unit 503h, and a command process unit 503i.

The connection terminals 503a, 503b, 503c, and 503d are those for connecting the HDMI connection cables 600, 700, 800, and 900 respectively.

The switching unit 503e selects any one of the connection terminals 503a, 503b, 503c, and 503d.

For example, if the switching unit 503e selects the connection terminal 503a, a power line included in the HDMI cable 600 is connected with a power supply detection unit (not illustrated) included in the television 500. The HPD line 601 is connected with the HPD output unit 503f, the DDC line 602 is connected with the EDID output unit 503g, and the TMDS line 603 is connected with the reception unit 503h. In this case, the television 500 is supplied with a predetermined power, video data, audio data, and auxiliary data from the camera 100 via the HDMI cable 600. Further, the television 500 supplies the HPD signal and the EDID to the camera 100 via the HDMI cable 600.

When the switching unit 503e selects the connection terminal 503a, the connection terminals 503b, 503c, and 503d are not selected, so that the cameras 200, 300, and 400 cannot supply the television 500 with the predetermined power, video data, audio data, and auxiliary data. In this case, the television 500 does not supply the HPD signal and the EDID to the cameras 200, 300, and 400.

For example, if the switching unit 503e selects the connection terminal 503b, a power line included in the HDMI cable 700 is connected with a power supply detection unit (not illustrated) included in the communication unit 503. In this case, the HPD line, the DDC line, and the TMDS line of the HDMI cable 700 are respectively connected with the HPD output unit 503f, the EDID output unit 503g, and the reception unit 503h. In this case, the television 500 is supplied with a predetermined power, video data, audio data, and auxiliary data from the camera 200 via the HDMI cable 700. Further, the television 500 supplies the HPD signal and the EDID to the camera 200 via the HDMI cable 700. Thus, the camera 100 cannot supply the television 500 with the predetermined power, video data, audio data, and auxiliary data. In addition, the television 500 does not supply the HPD signal and the EDID to the camera 100 in this case.

Even if the switching unit 503e selects any one of the connection terminals 503a, 503b, 503c, and 503d, the command process unit 503i is connected with the connection terminals 503a, 503b, 503c, and 503d. Therefore, even if the switching unit 503e selects anyone of the connection terminals 503a, 503b, 503c, and 503d, the television 500 can receive the CEC command from the cameras 100, 200, 300, and 400. Further, even if the switching unit 503e selects anyone of the connection terminals 503a, 503b, 503c, and 503d, the television 500 can transmit the CEC command to the cameras 100, 200, 300, and 400.

The power supply detection unit (not illustrated) included in the communication unit 503 determines whether the predetermined power supply is detected via the connection terminal selected by the switching unit 503e.

The HPD output unit 503f outputs the H level of HPD signal or the L level of HPD signal via the connection terminal selected by the switching unit 503e. The HPD output unit 503f does not output the HPD signal via the connection terminal that is not selected by the switching unit 503e. If the predetermined power supply is not detected by the power supply detection unit (not illustrated) included in the communication unit 503 via the connection terminal selected by the switching unit 503e, the HPD output unit 503f outputs the L level of HPD signal via the connection terminal selected by the switching unit 503e.

If the predetermined power supply is detected by the power supply detection unit (not illustrated) included in the communication unit 503 via the connection terminal selected by the switching unit 503e, the HPD output unit 503f determines whether the EDID of the television 500 corresponding to the selected connection terminal can be transmitted. If the EDID of the television 500 corresponding to the selected connection terminal can be transmitted, the HPD output unit 503f outputs the H level of HPD signal via the connection terminal selected by the switching unit 503e. Further, if the EDID of the television 500 corresponding to the selected connection terminal cannot be transmitted, the HPD output unit 503f outputs the L level of HPD signal via the connection terminal selected by the switching unit 503e.

In the television 500, a unique physical address is set for each connection terminal. Information indicating the unique physical address set for each connection terminal is included in the EDID.

The physical address set in the television 500 is specified in the HDMI standard and is information indicating a communication path of each apparatus in the communication system illustrated in FIG. 1.

If the H level of HPD signal is output via the connection terminal selected by the switching unit 503e, the EDID output unit 503g determines whether to receive a request for acquiring the EDID of the television 500 via the connection terminal selected by the switching unit 503e.

If the EDID output unit 503g receives the request for acquiring the EDID of the television 500 when the H level of HPD signal is output via the connection terminal selected by the switching unit 503e, the EDID output unit 503g transmits the EDID of the television 500 via the connection terminal selected by the switching unit 503e.

If the EDID output unit 503g receives the request for acquiring the EDID of the television 500 when the L level of HPD signal is output via the connection terminal selected by the switching unit 503e, the EDID output unit 503g does not transmit the EDID of the television 500.

The reception unit 503h receives video data, audio data, and auxiliary data via the connection terminal selected by the switching unit 503e.

If the connection terminal 503a is selected by the switching unit 503e, the video data received by the reception unit 503h from the camera 100 via the TMDS line 603 is recorded in the memory 506 and displayed on the display unit 504. In this case, the audio data received by the reception unit 503*h* from the camera 100 via the TMDS line 603 is recorded in the memory 506 and output from a speaker unit (not illustrated). Further, the auxiliary data received by the reception unit 503*h* from the camera 100 via the TMDS line 603 are supplied to the CPU 501. The CPU 501 controls the television 500 according to the auxiliary data received from the camera 100.

If the connection terminal 503*a* is not selected by the switching unit 503*e*, the video data transmitted from the camera 100 via the TMDS line 603 is not displayed on the display unit 504. In this case, the audio data transmitted from the camera 100 via the TMDS line 603 is not output from the speaker unit (not illustrated).

If the command process unit 503*i* receives the CEC command transmitted from the cameras 100, 200, 300, and 400, the command process unit 503*i* supplies the received CEC command to the CPU 501. The CPU 501 controls the television 500 according to the CEC command received by the command process unit 503*i*.

The command process unit 503*i* supplies a positive response or a negative response to the transmission source of the received CEC command according to the CEC command received by the command process unit 503*i*. The command process unit 503*i* can transmit the CEC command generated by the CPU 501 and supplied to the command process unit 503*i*.

The number of the connection terminals included in the communication unit 503 for connecting the HDMI cable is arbitrarily set according to the television 500. For example, the television 500 may include four or more connection terminals for connecting the HDMI cable.

The display unit 504 includes a display device such as a liquid crystal display. The display unit 504 displays video data supplied from at least one of the tuner unit 502 and the communication unit 503.

The operation unit 505 provides a user interface for operating the television 500. The operation unit 505 includes a plurality of buttons for operating the television 500. The CPU 501 controls the television 500 according to a user's instruction input via the operation unit 505. Each button included in the operation unit 505 is constituted of a switch and a touch panel.

The memory 506 functions as a buffer of the television 500 and can temporarily record video data, audio data, and auxiliary data acquired by the communication unit 503. The memory 506 is not limited to the RAM, but may be an external storage device such as a hard disk device.

The audio output unit 507 includes an audio output device such as a speaker. The audio output unit 507 outputs audio data supplied from at least one of the tuner unit 502 and the communication unit 503.

The ROM 508 stores a computer program for controlling the television 500 executed by the CPU 501. The ROM 508 also stores thresholds related to a process and an operation performed by the television 500 and parameters related to a process and an operation performed by the television 500. The ROM 508 may be a storage device such as a hard disk device.

FIG. 3 illustrates a table indicating a corresponding relationship between a logical address described in the CEC protocol and the device type of the electronic apparatus.

The device types of the cameras 100, 200, 300, and 400 correspond to, for example, a "Playback Device 1", a "Playback Device 2", and a "Playback Device 3", in FIG. 3. Thus, the cameras 100, 200, 300, and 400 can acquire at least any one of the logical addresses 4, 8, and 11 illustrated in FIG. 3. The device type of the television 500 corresponds to "TV" illustrated in FIG. 3 and the television 500 can acquire the logical address 0.

Figure 4:
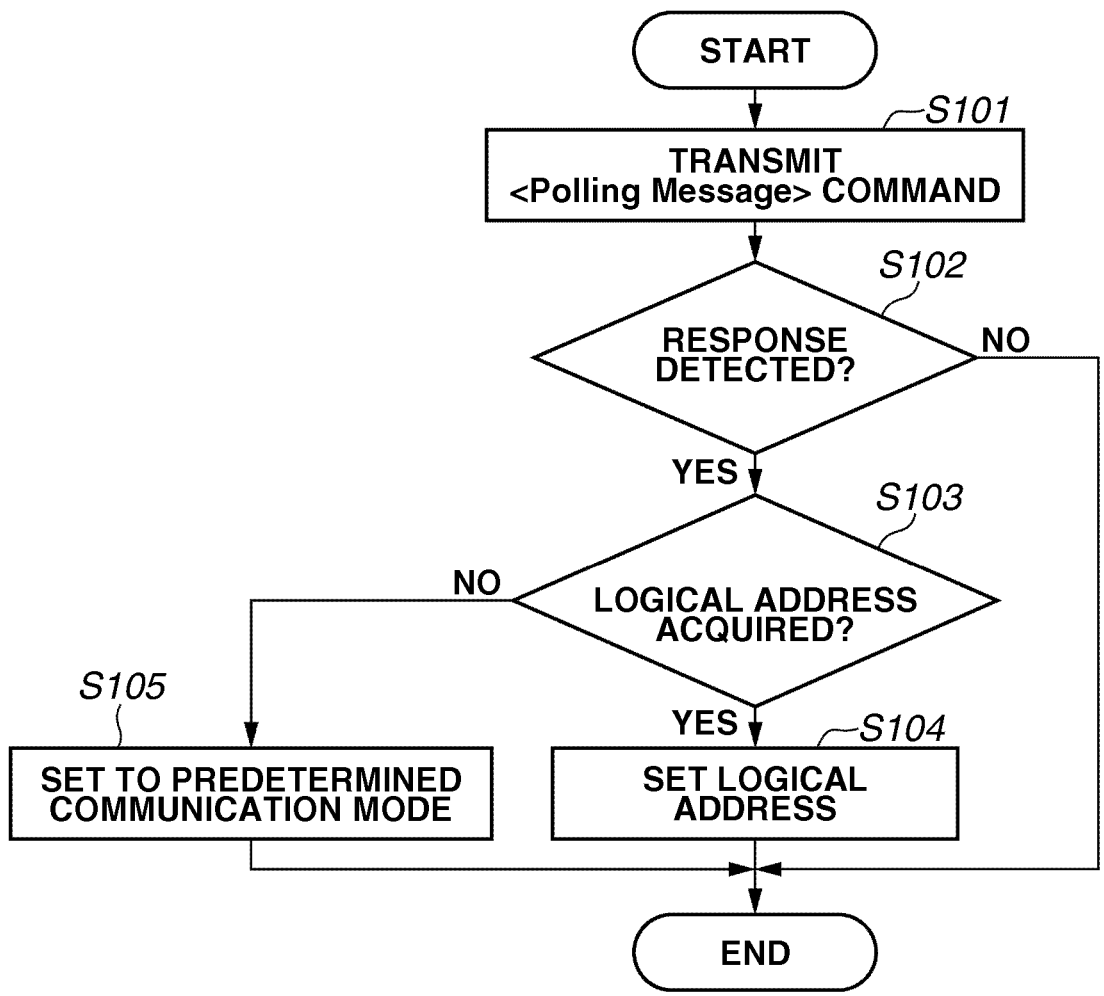
FIG. 4 is a flow chart illustrating an example of a logical address acquisition process performed by the electronic apparatus according to the first exemplary embodiment.

A logical address acquisition process performed by the camera 100 is described below with reference to a flowchart illustrated in FIG. 4. The logical address acquisition process illustrated in FIG. 4 is performed by the camera 100 such that the CPU 101 executes the program recorded in the ROM 108. It is assumed that a logical address 15 is set in the memory 102 of the camera 100 before the logical address acquisition process illustrated in FIG. 4 is performed.

In step S101, the CPU 101 controls the command process unit 103*e* to transmit a <Polling Message> command to the television 500 via the CEC line 604. The <Polling Message> command is not the broadcast command, but the CEC command. The <Polling Message> command is used for detecting whether the logical address corresponding to the device type of the camera 100 is acquired by another apparatus. If the <Polling Message> command is transmitted to the television 500, the process proceeds from step S101 to step S102 in the present flow chart.

In step S102, the CPU 101 determines whether the command process unit 103*e* detects a response to the <Polling Message> command. If the CPU 101 determines that the command process unit 103*e* detects a positive response (YES in step S102), the process proceeds from step S102 to step S103 in the present flow chart.

If the CPU 101 determines that the command process unit 103*e* does not detect a response (NO in step S102), the process in the present flow chart is ended. In addition, if the CPU 101 determines that the command process unit 103*e* detects a negative response (YES in step S102), the process proceeds from step S102 to step S103 in the present flow chart.

In step S103, the CPU 101 determines whether the logical address corresponding to the device type of the camera 100 is acquired. In this case, the CPU 101 determines whether any one of the logical addresses 4, 8, and 11 is acquired. If the CPU 101 determines that any one of the logical addresses 4, 8, and 11 is acquired (YES in step S103), the process proceeds from step S103 to step S104 in the present flow chart. If the CPU 101 determines that none of the logical addresses 4, 8, and 11 is acquired (NO in step S103), the process proceeds from step S103 to step S105 in the present flow chart.

In step S104, the CPU 101 sets the acquired logical address to the memory 102. If the logical address 15 is set to the memory 102, the CPU 101 sets any one of the logical addresses 4, 8, and 11 to the memory 102 and discards setting of the logical address 15.

In this case, the camera 100 can transmit the CEC command to any one of the television 500 and the cameras 200, 300, and 400 by using the logical address set to the memory 102. Further, the camera 100 can receive the CEC command from any one of the television 500 and the cameras 200, 300, and 400 by using the logical address set to the memory 102. Accordingly, the process in the present flow chart is ended.

In step S105, the CPU 101 sets the camera 100 to a predetermined communication mode.

The predetermined communication mode is a mode to be used for performing communication corresponding to the CEC protocol using the logical address 15, which is the logical address that does not correspond to the device type of the camera 100.

If the camera 100 is in the predetermined communication mode, the CPU 101 sets the logical address 15 to the memory 102. If the camera 100 is in the predetermined communication mode, the camera 100 can transmit the broadcast command and a <Vendor Command with ID> command described in the CEC protocol to the television 500 and the cameras 200, 300, and 400.

Further, if the camera 100 is in the predetermined communication mode, the camera 100 can receive the broadcast command and the <Vendor Command with ID> command described in the CEC protocol. If the camera 100 is in the predetermined communication mode, the camera 100 can transmit a <Vendor Command> to the television 500 and the cameras 200, 300, and 400 and receive the <Vendor Command>.

If the camera 100 is in the predetermined communication mode, however, the camera 100 cannot receive a specific CEC command transmitted from any one of the television 500 and the cameras 200, 300, and 400. If the camera 100 is in the predetermined communication mode, the camera 100 cannot transmit the specific CEC command to any one of the television 500 and the cameras 200, 300, and 400.

The specific command is the CEC command described in the CEC protocol and the command that is not the <Vendor Command with ID> command. The specific command refers to, for example, an <Image View On> command, a <Text View On> command, a <Give Physical Address> command, and a <Set OSD String> command. The specific command further refers to, for example, an <Active Source> command and a <Report Physical Address> command. However, a <Polling Message> command is not included in the specific command.

In the first exemplary embodiment, the logical address that does not correspond to the device type of the camera 100 is any one of the logical addresses 12, 13, 14, and 15, for example. In the first exemplary embodiment, if the camera 100 is in the predetermined communication mode, the CPU 101 does not set the logical addresses 0 to 11 illustrated in FIG. 3 to the memory 102. If the camera 100 is set to the predetermined communication mode in step S105, the process in the present flow chart is ended.

In step S105, if the logical address 15 is already set to the memory 102, the process in step S105 may be omitted. Although it is assumed that the logical address 15 is set in the memory 102 of the camera 100 before the logical address acquisition process illustrated in FIG. 4 is performed, the finally acquired logical address may be set to the memory 102.

The logical address acquisition process illustrated in FIG. 4 may be performed at regular intervals by the camera 100 or may be performed if the camera 100 is connected with the television 500 via the HDMI cable 600. Further, the logical address acquisition process illustrated in FIG. 4 may be performed if the camera 100 is brought into a mode for communicating with the television 500 using the HDMI cable 600.

Figure 5:
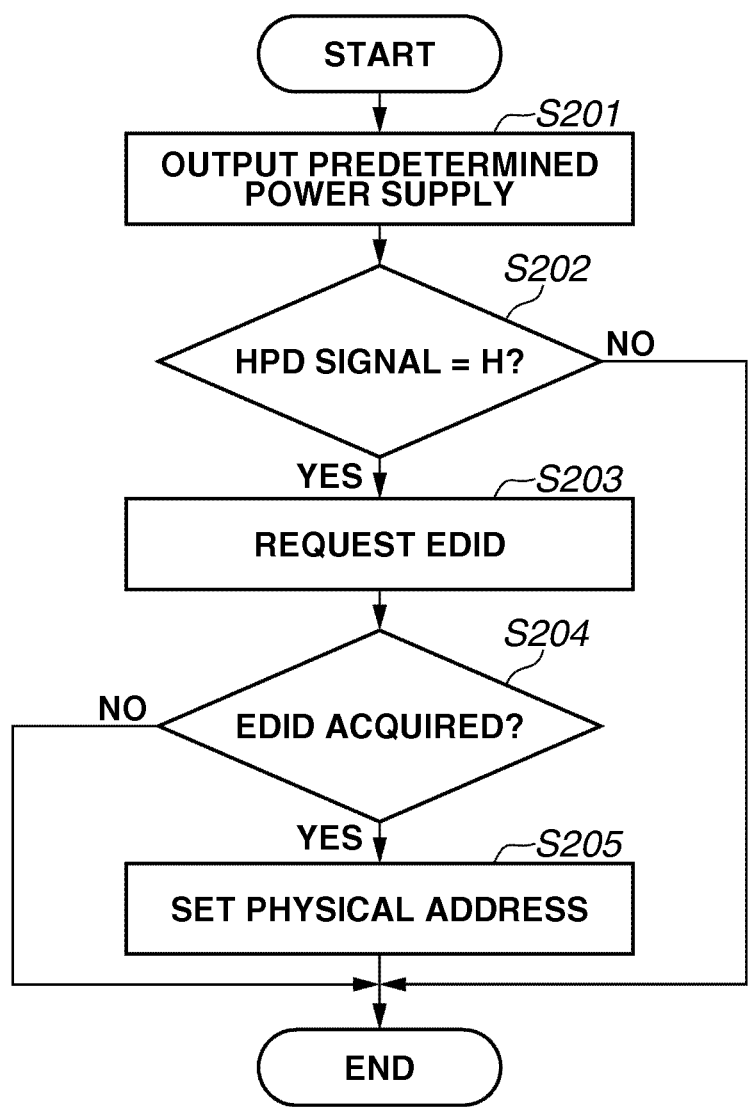
FIG. 5 is a flow chart illustrating an example of a physical address acquisition process performed by the electronic apparatus according to the first exemplary embodiment.

A physical address acquisition process performed by the camera 100 is described below with reference to a flowchart illustrated in FIG. 5. The physical address acquisition process illustrated in FIG. 5 is performed by the camera 100 such that the CPU 101 executes the program recorded in the ROM 108.

In step S201, the CPU 101 controls the communication unit 103 to output a predetermined power to the television 500 via the power line (not illustrated) included in the HDMI cable 600. Then, the process proceeds from step S201 to step S202 in the present flow chart.

In step S202, the CPU 101 determines whether the HPD signal detected by the HPD detection unit 103b is in the H level. If the CPU 101 determines that the HPD signal detected by the HPD detection unit 103b is in the H level (YES in step S202), the process proceeds from step S202 to step S203 in the present flow chart. If the CPU 101 determines that the HPD signal detected by the HPD detection unit 103b is in the L level (NO in step S202), the process in the present flow chart is ended.

In step S203, the CPU 101 controls the EDID acquisition unit 103c to transmit a request for acquiring the EDID from the television 500 via the DDC line 602. Then, the process proceeds from step S203 to step S204 in the present flow chart.

In step S204, the CPU 101 determines whether the EDID acquisition unit 103c acquires the EDID from the television 500. If the CPU 101 determines that the EDID acquisition unit 103c acquires the EDID from the television 500 (YES in step S204), the process proceeds from step S204 to step S205 in the present flow chart. If the CPU 101 determines that the EDID acquisition unit 103c does not acquire the EDID from the television 500 (NO in step S204), the process in the present flow chart is ended.

In step S205, the CPU 101 analyzes the EDID acquired from the television 500 in step S204 to acquire the physical address included in the EDID. If the physical address is acquired, the CPU 101 records the acquired physical address in the memory 102. Then, the process in the present flow chart is ended.

The physical address acquisition process illustrated in FIG. 5 may be performed at regular intervals by the camera 100 or may be performed if the camera 100 is connected with the television 500 via the HDMI cable 600. Further, the physical address acquisition process illustrated in FIG. 5 may be performed if the camera 100 is brought into a mode for communicating with the television 500 using the HDMI cable 600.

Figure 6:
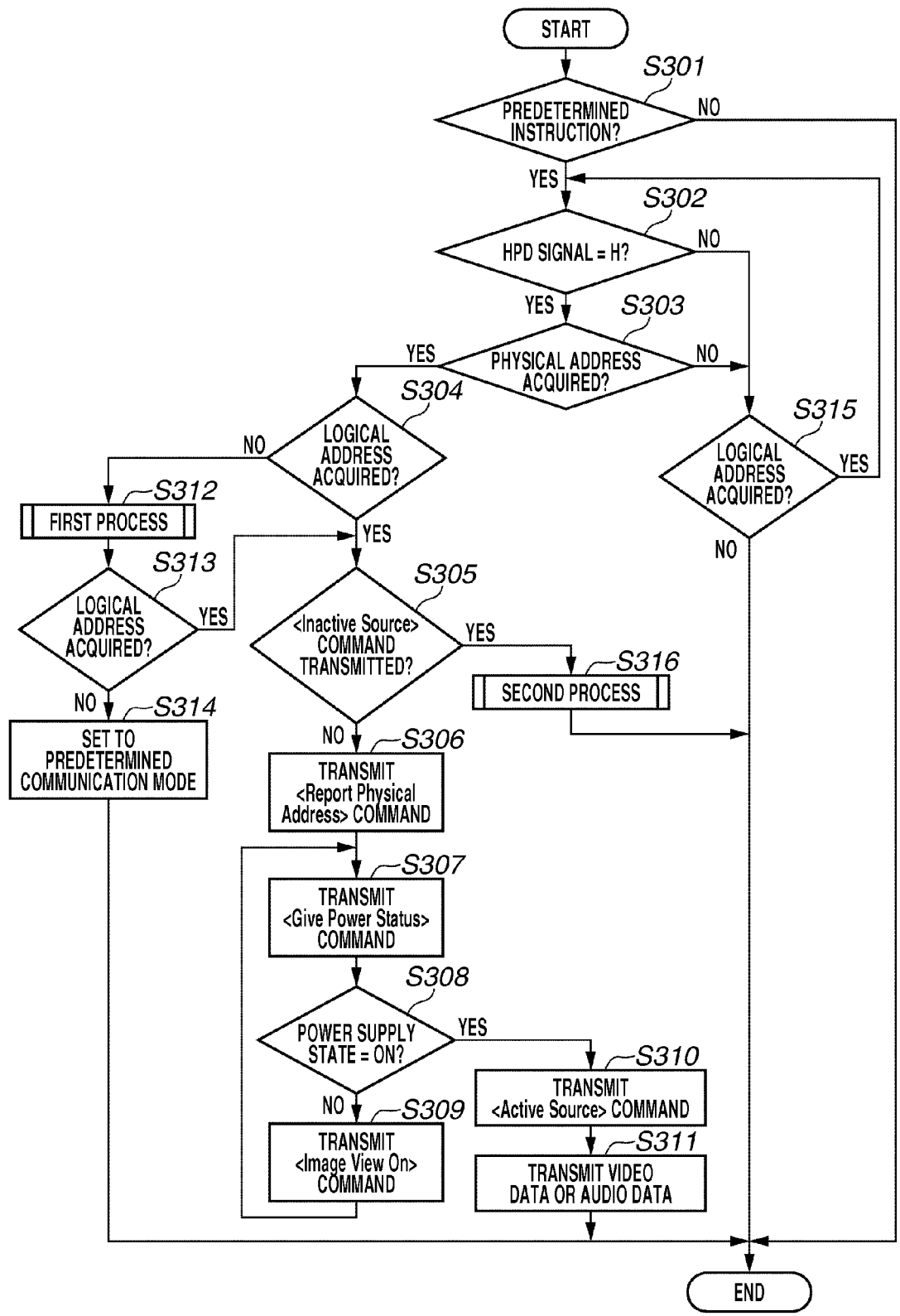
FIG. 6 is a flow chart illustrating an example of a transmission process performed by the electronic apparatus according to the first exemplary embodiment.

A transmission process performed by the camera 100 is described below with reference to a flow chart illustrated in FIG. 6. The transmission process illustrated in FIG. 6 is performed by the camera 100 such that the CPU 101 executes the program recorded in the ROM 108. When the transmission process illustrated in FIG. 6 is performed, it is assumed that a predetermined power is output from the communication unit 103 to the television 500 via the power line (not illustrated) included in the HDMI cable 600.

In step S301, the CPU 101 determines whether a predetermined instruction for outputting the video data and the audio data recorded in the camera 100 to the television 500 is input.

If the camera 100 is connected with the television 500 via the HDMI cable 600, for example, a reproduction button of the operation unit 107 is operated to input the predetermined instruction to the CPU 101 via the operation unit 107.

In addition, if the camera 100 is connected with the television 500 via the HDMI cable 600, for example, the predetermined instruction is input to the CPU 101. The predetermined instruction may be an instruction for causing the camera 100 to perform one-touch play described in the CEC protocol.

If the CPU 101 determines that the predetermined instruction is input to the CPU 101 (YES in step S301), the process proceeds from step S301 to step S302 in the present flow chart. If the CPU 101 determines that the predetermined instruction is not input to the CPU 101 (NO in step S301), the process in the present flow chart is ended.

In step S302, the CPU 101 determines whether the HPD signal detected by the HPD detection unit 103b is in the H level. If the CPU 101 determines that the HPD signal detected by the HPD detection unit 103b is in the H level (YES in step S302), the process proceeds from step S302 to step S303 in the present flow chart. If the CPU 101 determines that the HPD signal detected by the HPD detection unit 103b is in the L level (NO in step S302), the process proceeds from step S302 to step S315 in the present flow chart.

In step S303, the CPU 101 determines whether the physical address is recorded in the memory 102. If the CPU 101 determines that the physical address is recorded in the memory 102 (YES in step S303), the process proceeds from step S303 to step S304 in the present flow chart. If the CPU 101 determines that the physical address is not recorded in the memory 102 (NO in step S303), the process proceeds from step S303 to step S315 in the present flow chart.

In step S304, the CPU 101 determines whether the logical address corresponding to the device type of the camera 100 is set to the memory 102. If the CPU 101 determines that the logical address corresponding to the device type of the camera 100 is set to the memory 102 (YES in step S304), the process proceeds from step S304 to step S305 in the present flow chart. If the CPU 101 determines that the logical address corresponding to the device type of the camera 100 is not set to the memory 102 (NO in step S304), the process proceeds from step S304 to step S312 in the present flow chart.

In step S305, the CPU 101 determines whether the command process unit 103e transmits an <Inactive Source> command to the television 500 via the CEC line 604. The <Inactive Source> command is the CEC command for notifying the television 500 that the camera 100 does not transmit video data and audio data to the television 500. The <Inactive Source> command is not the broadcast command.

If the CPU 101 determines that the <Inactive Source> command is transmitted to the television 500 via the CEC line 604 (YES in step S305), the process proceeds from step S305 to step S316 in the present flow chart.

If the CPU 101 determines that the <Inactive Source> command is not transmitted to the television 500 via the CEC line 604 (NO in step S305), the process proceeds from step S305 to step S306 in the present flow chart.

In step S306, the CPU 101 controls the command process unit 103e to transmit the <Report Physical Address> command to the television 500 and the cameras 200, 300, and 400 via the CEC line 604. The <Report Physical Address> command is the broadcast command for notifying the television 500 and the cameras 200, 300, and 400 of the physical address corresponding to the camera 100 and the logical address corresponding to the camera 100. If the <Report Physical Address> command is transmitted to the television 500 and the cameras 200, 300, and 400, the process proceeds from step S306 to step S307 in the present flow chart.

In step S307, the CPU 101 controls the command process unit 103e to transmit a <Give Power Status> command to the television 500 via the CEC line 604. The <Give Power Status> command is a command for requesting the television 500 to inform the power supply status of the television 500. If the <Give Power Status> command is transmitted to the television 500, the process proceeds from step S307 to step S308 in the present flow chart.

If the television 500 receives the <Give Power Status> command, the CPU 501 controls the command process unit 503i to transmit a <Report Power Status> command including information indicating the power supply status of the television 500 to the camera 100.

If the television 500 is in a power-on state, the <Report Power Status> command includes information indicating that the power supply of the television 500 is turned on. If the television 500 shifts from the power-on state to a standby state, the <Report Power Status> command includes information indicating that the power supply of the television 500 shifts from a standby state to an ON state.

If the television 500 is in the standby state, the <Report Power Status> command includes information indicating that the power supply of the television 500 is in the standby state.

If the power supply of the television 500 shifts from the standby state to the power-on state, the <Report Power Status> command includes information indicating that the power supply of the television 500 shifts from the ON state to the standby state.

In step S308, the CPU 101 determines whether the power supply of the television 500 is turned on according to the <Report Power Status> command received by the command process unit 103e from the television 500.

If the CPU 101 determines that the <Report Power Status> command received from the television 500 does not include the information indicating that the power supply of the television 500 is turned on (NO in step S308), the process proceeds from step S308 to step S309 in the present flow chart. In the case where the command process unit 103e does not receive the <Report Power Status> command from the television 500, the process proceeds from step S308 to step S309 in the present flow chart.

If the CPU 101 determines that the <Report Power Status> command received from the television 500 includes the information indicating that the power supply of the television 500 is turned on (YES in step S308), the process proceeds from step S308 to step S310 in the present flow chart.

In step S309, the CPU 101 controls the command process unit 103e to transmit the <Image View On> command for turning on the power supply of the television 500 to the television 500 via the CEC line 604. Then, the process returns from step S309 to step S307 in the present flow chart. In step S309, the CPU 101 may transmit the <Text View On> command to the television 500 instead of the <Image View On> command. The <Text View On> and <Image View On> commands are the CEC command that are not the broadcast command.

In step S310, the CPU 101 controls the command process unit 103e to transmit the <Active Source> command to the television 500 via the CEC line 604. The <Active Source> command is the broadcast command for causing the television 500 to select the connection terminal with which the camera 100 is connected to cause the television 500 to output the video data and the audio data transmitted from the camera 100 to the television 500.

The <Active Source> command includes the physical address corresponding to the camera 100. The physical address corresponding to the camera 100 is included in the EDID acquired by the command process unit 103e from the television 500. Then, the process proceeds from step S310 to step S311 in the present flow chart.

In step S311, the CPU 101 controls the transmission unit 103d to transmit at least one of the video data and the audio data to the television 500 via the TMDS line 603. In step S311, the video data and the audio data transmitted to the television 500 are data pieces generated by the camera 100 according to the EDID acquired by the EDID acquisition unit 103c from the television 500. Then, the process in the present flow chart is ended.

In step S312, the CPU 101 performs a first process. The first process is the process for acquiring the logical address corresponding to the device type of the camera 100 and is different from the logical address acquisition process illustrated in FIG. 3. The first process is described below. If the first process is performed, the process proceeds from step S312 to step S313 in the present flow chart.

In step S313, similarly to step S304, the CPU 101 determines whether the logical address corresponding to the device type of the camera 100 is set to the memory 102. If the CPU 101 determines that the logical address corresponding to the device type of the camera 100 is set to the memory 102

(YES in step S313), the process proceeds from step S313 to step S305 in the present flow chart. If the CPU 101 determines that the logical address corresponding to the device type of the camera 100 is not set to the memory 102 (NO in step S313), the process proceeds from step S313 to step S314 in the present flow chart.

In step S314, similarly to step S105, the CPU 101 sets the camera 100 to the predetermined communication mode. Then, the process in the present flow chart is ended.

In step S315, similarly to step S304, the CPU 101 determines whether the logical address corresponding to the device type of the camera 100 is set to the memory 102.

If the CPU 101 determines that the logical address corresponding to the device type of the camera 100 is set to the memory 102 (YES in step S315), the process returns from step S315 to S302 in the present flow chart. If the CPU 101 determines that the logical address corresponding to the device type of the camera 100 is not set to the memory 102 (NO in step S315), the process in the present flow chart is ended.

In step S316, the CPU 101 performs a second process. The second process is the process for deleting the logical address corresponding to the device type of the camera 100 recorded in the memory 102. The second process is described below. If the second process is performed, then, the process in the present flow chart is ended.

In the case where the camera 100 acquires the logical address, but cannot acquire the physical address even after a certain period of time elapses, the camera 100 may perform the second process.

Figure 7:
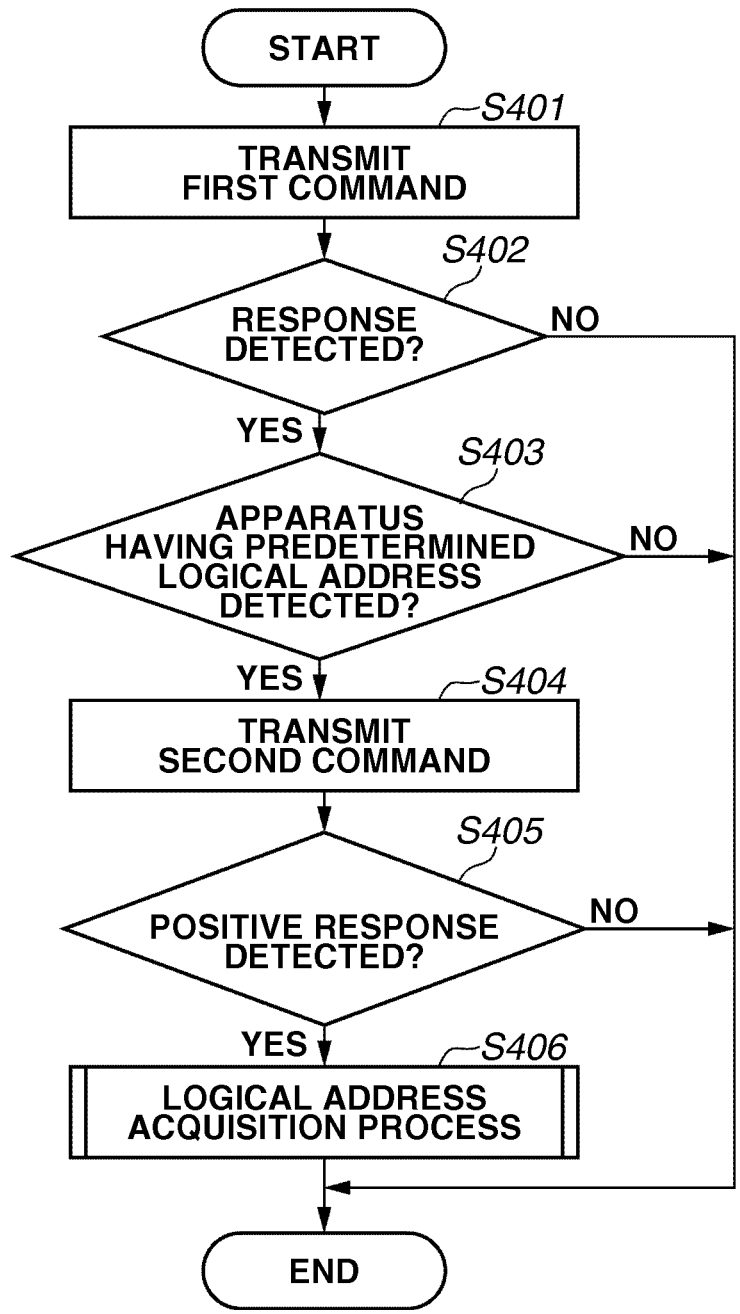
FIG. 7 is a flow chart illustrating an example of a first process performed by the electronic apparatus according to the first exemplary embodiment

The first process performed by the camera 100 in step S312 in the transmission process illustrated in FIG. 6 is described below with reference to a flow chart illustrated in FIG. 7. The first process illustrated in FIG. 7 is performed by the camera 100 such that the CPU 101 executes the program recorded in the ROM 108.

In step S401, the CPU 101 controls the command process unit 103e to transmit a first command to the television 500 and the cameras 200, 300, and 400 via the CEC line 604. The first command is the broadcast command for requesting an apparatus having the same manufacturer name as the camera 100 to inform the logical address corresponding to the apparatus having the same manufacturer name as the camera 100. The first command is a "Vendor Specific Command With ID" command and includes information indicating the manufacturer name of the camera 100. Then, the process proceeds from step S401 to step S402 in the present flow chart.

In step S402, the CPU 101 determines whether the command process unit 103e detects a response to the first command.

For example, if the camera 200 has the same manufacturer name as the camera 100 and receives the first command, the camera 200 determines whether to acquire the logical address corresponding to the device type of the camera 200. If the camera 200 acquires the logical address corresponding to the device type of the camera 200, the camera 200 transmits information indicating the logical address acquired by the camera 200 as a response to the first command.

If the camera 200 does not acquire the logical address corresponding to the device type of the camera 200, the camera 200 does not transmit a response to the first command to the camera 100. If the camera 200 does not have the same manufacturer name as the camera 100 and the camera 200 receives the first command, the camera 200 does not transmit a response to the first command to the camera 100. In this case, the cameras 300 and 400 and the television 500 perform the same operation as the camera 200.

In the case where the television 500 has the same manufacturer name as the camera 100 and acquires the logical address "0", when receiving the first command from the camera 100, the television 500 transmits information indicating the logical address "0" to the camera 100.

In the case where the camera 200 has the same manufacturer name as the camera 100 and acquires the logical address "4", when receiving the first command from the camera 100, the camera 200 transmits information indicating the logical address "4" to the camera 100.

In the case where the camera 300 has the same manufacturer name as the camera 100 and acquires the logical address "8", when receiving the first command from the camera 100, the camera 300 transmits information indicating the logical address "8" to the camera 100.

In the case where the camera 400 has the same manufacturer name as the camera 100 and acquires the logical address "11", when receiving the first command from the camera 100, the camera 400 transmits information indicating the logical address "11" to the camera 100.

If the CPU 101 determines that the command process unit 103e detects at least one response to the first command (YES in step S402), the process proceeds from step S402 to step S403 in the present flow chart. If the CPU 101 determines that the command process unit 103e detects none of responses to the first command (NO in step S402), the process in the present flow chart is ended.

In step S403, the CPU 101 determines whether an electronic apparatus acquiring a predetermined logical address corresponding to the device type of the camera 100 is detected. In step S403, the CPU 101 detects the electronic apparatus acquiring the logical address corresponding to the device type of the camera 100 according to the response to the first command detected by the command process unit 103e in step S402.

For example, the predetermined logical address is at least one of the logical addresses "4", "8", and "11" corresponding to the device type of the camera 100. The CPU 101 determines whether information indicating at least one of the logical addresses "4", "8", and "11" is included in the response to the first command detected by the command process unit 103e in step S402.

If the CPU 101 determines that information indicating at least one of the logical addresses "4", "8", and "11" is included in the response to the first command detected by the command process unit 103e (YES in step S403), the process proceeds from step S403 to step S404 in the present flow chart. If the CPU 101 determines that information indicating at least one of the logical addresses "4", "8", and "11" is not included in the response to the first command detected by the command process unit 103e in step S402 (NO in step S403), the process in the present flow chart is ended.

In step S404, the CPU 101 controls the command process unit 103e to transmit a second command via the CEC line 604 to the electronic apparatus acquiring the predetermined logical address corresponding to the device type of the camera 100 detected in step S403. The second command is the one for requesting the electronic apparatus acquiring the predetermined logical address corresponding to the device type of the camera 100 to reset the setting of the acquired logical address.

The second command is not the broadcast command, but information indicating a transmission destination including the logical address of the electronic apparatus acquiring the predetermined logical address detected in step S403. The second command is the "Vendor Specific Command With ID" command including information indicating the manufacturer name of the camera 100. Then, the process proceeds from step S404 to step S405 in the present flow chart. If a plurality of electronic apparatuses is detected in step S403, the second command is assumed to be transmitted from the camera 100 to one electronic apparatus among the detected plurality of electronic apparatuses.

In step S405, the CPU 101 determines whether the command process unit 103e detects a positive response to the second command.

For example, if the camera 200 has the same manufacturer name as the camera 100 and receives the second command, the camera 200 determines whether the camera 200 is in an active state. The active state refers to a state where the camera 200 cannot reset the logical address corresponding to the device type of the camera 200. More specifically, if the camera 200 transmits the <Active Source> command to the television 500 and transmits the video data and the audio data to the television 500, the camera 200 is in the active state. Further, if the camera 200 does not transmit the video data and the audio data, but transmits the <Inactive Source> command to the television 500, the camera 200 is not in the active state.

When the camera 200 is in the active state, the camera 200 transmit a negative response as a response to the second command to the camera 100. When the camera 200 is not in the active state, the camera 200 transmits the positive response as a response to the second command to the camera 100.

If the camera 200 does not have the same manufacturer name as the camera 100 and receives the second command, the camera 200 does not transmit a response to the second command to the camera 100. In this case, the cameras 300 and 400 and the television 500 perform the same operation as the camera 200.

In step S405, if the CPU 101 determines that the command process unit 103e detects the positive response to the second command (YES in step S405), the process proceeds from step S405 to step S406 in the present flow chart. If the CPU 101 determines that the command process unit 103e does not detect the positive response to the second command (NO in step S405), the process in the present flow chart is ended.

In step S406, the CPU 101 performs the logical address acquisition process illustrated in FIG. 4. If the logical address acquisition process is performed by the CPU 101, the process in the present flow chart is ended, and the process proceeds to step S313 in FIG. 3.

In step S405, if the CPU 101 determines that the command process unit 103e detects the positive response to the second command, the electronic apparatus, which transmitted the positive response to the camera 100, resets the setting of the logical address according to the second command. Accordingly, this process makes a state where one of the predetermined logical addresses corresponding to the device type of the camera 100 is not acquired by other electronic apparatuses. Therefore, in step S406, the CPU 101 performs the logical address acquisition process to acquire the logical address corresponding to the device type of the camera 100.

Figure 8:
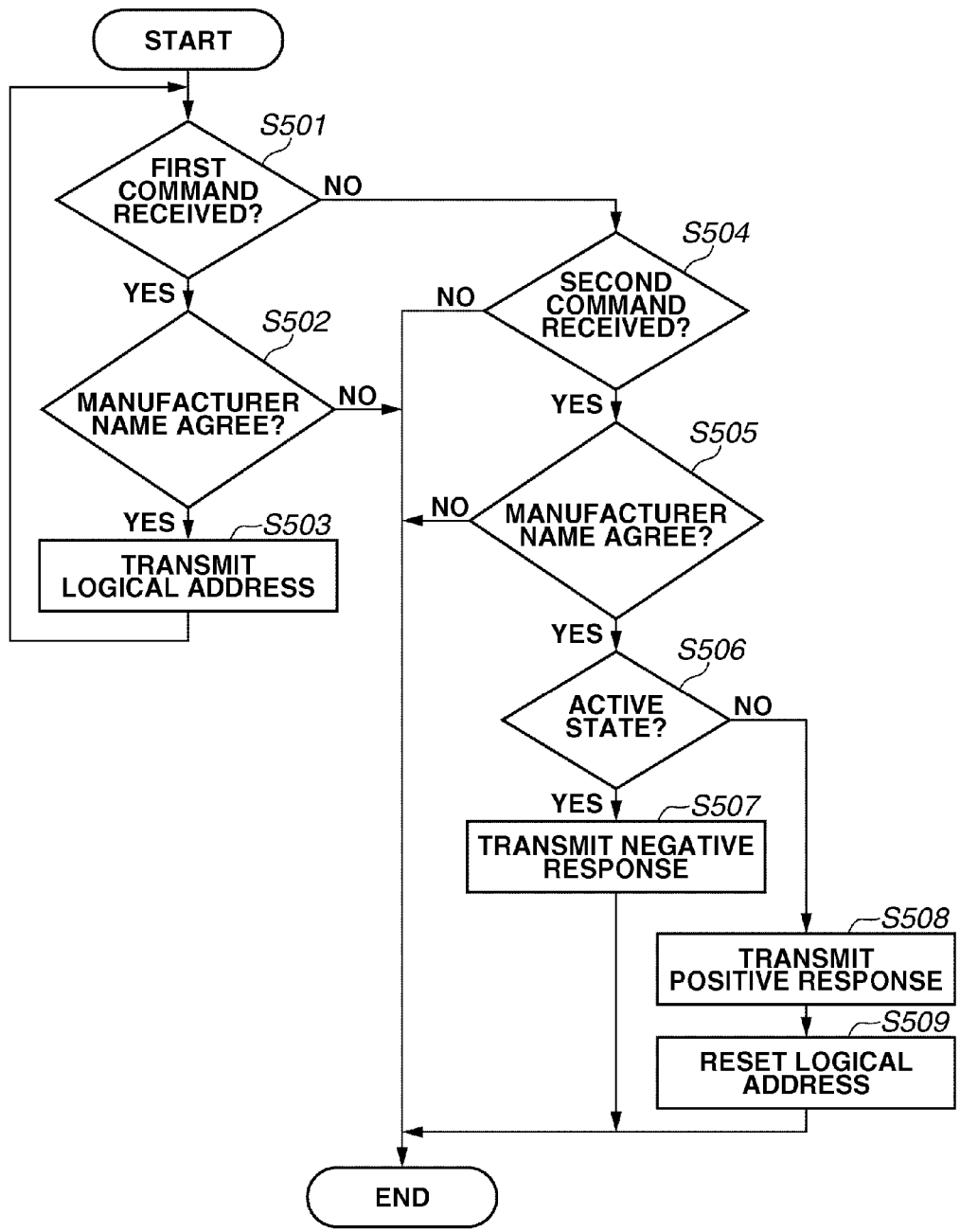
FIG. 8 is a flow chart illustrating an example of a second process performed by the electronic apparatus according to the first exemplary embodiment.

The second process performed by the camera 100 in step S316 in the transmission process illustrated in FIG. 6 is described below with reference to the flow chart illustrated in FIG. 8. The second process illustrated in FIG. 8 is performed by the camera 100 such that the CPU 101 executes the program recorded in the ROM 108.

In step S501, the CPU 101 determines whether the command process unit 103e receives the first command from at least one of the cameras 200, 300, and 400 excluding the camera 100 via the CEC line 604.

If the CPU 101 determines that the command process unit 103e has received the first command via the CEC line 604 (YES in step S501), the process proceeds from step S501 to step S502 in the present flow chart. If the CPU 101 determines that the command process unit 103e has not received the first command via the CEC line 604 (NO in step S501), the process proceeds from step S501 to step S504 in the present flow chart.

In step S502, the CPU 101 determines whether the information indicating the manufacturer name included in the first command received by the command process unit 103e agrees with information indicating the manufacturer name of the camera 100 recorded in the ROM 108.

If the CPU 101 determines that the information indicating the manufacturer name included in the first command received by the command process unit 103e agrees with the information indicating the manufacturer name of the camera 100 recorded in the ROM 108 (YES in step S502), the process proceeds from step S502 to step S503 in the present flow chart.

If the CPU 101 determines that the information indicating the manufacturer name included in the first command received by the command process unit 103e does not agree with the information indicating the manufacturer name of the camera 100 recorded in the ROM 108 (NO in step S502), the process in the present flow chart is ended.

In step S503, the CPU 101 controls the command process unit 103e to transmit information indicating the logical address acquired by the camera 100 as the response to the first command received by the command process unit 103e via the CEC line 604. Then, the process returns from step S503 to step S501 in the present flow chart. In step S503, the command process unit 103e transmits the response to the first command to the electronic apparatus that transmits the first command to the camera 100.

In step S504, the CPU 101 determines whether the command process unit 103e receives the second command from at least one of the cameras 200, 300, and 400 excluding the camera 100 via the CEC line 604.

If the CPU 101 determines that the command process unit 103e receives the second command via the CEC line 604 (YES in step S504), the process proceeds from step S504 to step S505 in the present flow chart. If the CPU 101 determines that the command process unit 103e does not receive the second command via the CEC line 604 (NO in step S504), the process in the present flow chart is ended. In step S505, the CPU 101 determines whether information indicating a manufacturer name included in the second command received by the command process unit 103e agrees with the information indicating the manufacturer name of the camera 100 recorded in the ROM 108.

If the CPU 101 determines that the information indicating the manufacturer name included in the second command received by the command process unit 103e agrees with the information indicating the manufacturer name of the camera 100 in the ROM 108 (YES in step S505), the process proceeds from step S505 to step S506 in the present flow chart.

If the CPU 101 determines that the information indicating the manufacturer name included in the second command received by the command process unit 103e does not agree with the information indicating the manufacturer name of the camera 100 in the ROM 108 (NO in step S505), the process in the present flow chart is ended.

In step S506, the CPU 101 determines whether the camera 100 is in the active state. For example, in step S506, the CPU 101 may determine whether the camera 100 is in the active state by determining whether the transmission unit 103d transmits the video data and the audio data to the television 500.

If the CPU 101 determines that the transmission unit 103*d* transmits the video data and the audio data to the television 500, the CPU 101 determines that the camera 100 is in the active state. If the CPU 101 determines that the transmission unit 103*d* does not transmit the video data and the audio data to the television 500, the CPU 101 determines that the camera 100 is not in the active state.

If the CPU 101 determines that the camera 100 is not in the active state (NO in step S506), the process proceeds from step S506 to step S508 in the present flow chart. If the CPU 101 determines that the camera 100 is in the active state (YES in step S506), the process proceeds from step S506 to step S507 in the present flow chart.

For example, in step S506, the CPU 101 may determine whether the camera 100 is in the active state by determining whether the camera 100 is in a mode which uses the CEC command. In this case, if the CPU 101 determines that the camera 100 is in the mode which uses the CEC command, the CPU 101 determine that the camera 100 is in the active state. Further, if the CPU 101 determines that the camera 100 is in the mode which does not use the CEC command, the CPU 101 determines that the camera 100 is not in the active state.

Further for example, in step S506, the CPU 101 may determine whether the camera 100 is in the active state by determining whether the command process unit 103*e* transmits the <Inactive Source> command to the television 500. In this case, if the CPU 101 determines that the command process unit 103*e* transmits the <Inactive Source> command to the television 500, the CPU 101 determines that the camera 100 is not in the active state. On the other hand, if the CPU 101 determines that the command process unit 103*e* does not transmit the <Inactive Source> command to the television 500, the CPU 101 determines that the camera 100 is in the active state.

In step S507, the CPU 101 controls the command process unit 103*e* to transmit a negative response to the second command received by the command process unit 103*e* via the CEC line 604. Then, the process in the present flow chart is ended. In step S507, the command process unit 103*e* further transmits the negative response to the second command to the electronic apparatus which transmits the second command to the camera 100.

In step S508, the CPU 101 controls the command process unit 103*e* to transmit the positive response to the second command received by the command process unit 103*e* via the CEC line 604. Then, the process proceeds from step S508 to step S509 in the present flow chart. In step S508, the command process unit 103*e* further transmits the positive response to the second command to the electronic apparatus which transmits the second command to the camera 100.

In step S509, the CPU 101 deletes the setting of the logical address recorded in the memory 102 therefrom according to the second command received by the command process unit 103*e* to reset the command process unit 103*e*. In step S509, the CPU 101 may reset the command process unit 103*e* by temporarily stopping the power supply to the command process unit 103*e* and then supplying power again to the command process unit 103*e*.

In step S509, even if the command process unit 103*e* is reset, the transmission unit 103*d*, the EDID acquisition unit 103*c*, and the HPD detection unit 103*b* are not reset.

Then, the process in the present flow chart is ended. If the command process unit 103*e* is reset, the CPU 101 performs again the logical address acquisition process illustrated in FIG. 4 when a predetermined period elapses after the command process unit 103*e* is reset.

In the above description, the device types of the cameras 100, 200, 300, and 400 are regarded as corresponding to the "Playback Device 1", the "Playback Device 2", and the "Playback Device 3". However, the device types of the cameras 100, 200, 300, and 400 may be the ones that correspond to a "Recording Device 1", a "Recording Device 2", and a "Recording Device 3". In this case, the cameras 100, 200, 300, and 400 acquire at least any one of the logical addresses "1", "2", and "9" illustrated in FIG. 3.

In the above description, the predetermined communication mode is regarded as the mode performing communication corresponding to the CEC protocol using the logical address "15" which is the logical address that does not correspond to the device type of the camera 100. However, the predetermined communication mode may be the mode performing communication corresponding to the CEC protocol using any one of the logical addresses "12", "13", and "14".

The logical address acquisition process in FIG. 3, the physical address acquisition process in FIG. 4, the transmission process in FIG. 6, the first process in FIG. 7, and the second process in FIG. 8, which are performed by the camera 100, are performed by the cameras 200, 300, and 400 similarly to the camera 100.

As described above, if the electronic apparatus 100 according to the first exemplary embodiment cannot acquire the logical address corresponding to the device type of the electronic apparatus 100, the electronic apparatus 100 is set to the predetermined communication mode. Accordingly, the electronic apparatus 100 acquires the logical address acquired by other electronic apparatuses as the logical address of the electronic apparatus 100 using the logical address which does not correspond to the device type of the electronic apparatus 100.

Further, the electronic apparatus 100 detects that other electronic apparatuses which acquire the logical address corresponding to the device type of the electronic apparatus 100 are in a state that the setting of the logical address can be reset and then acquires the logical address from the other electronic apparatuses. Therefore, the electronic apparatus 100 can acquire the logical address corresponding to the device type of the electronic apparatus 100 from the other electronic apparatuses without interrupting the communication of the other electronic apparatuses using the CEC command.

The electronic apparatus according to the present invention is not limited to that described in the first exemplary embodiment. The output apparatus according to the present invention is not limited to that described in the first exemplary embodiment. For example, the electronic apparatus and the output apparatus according to the present invention may be realized by a system including a plurality of apparatuses.

The processes performed by the electronic apparatus and the functions of the electronic apparatus described in the first exemplary embodiment can be realized by a computer program. In this case, the computer program according to the present invention can be executed by a computer (including a CPU) and realizes various functions described in the first exemplary embodiment.

It is to be understood that the various processes and functions described in the first exemplary embodiment may be realized by the computer program according to the present invention using an operating system (OS) operating on the computer.

The computer program according to the present invention can be read out from a computer readable recording medium and executed by the computer. A hard disk device, an optical disk, a compact disk read-only memory (CD-ROM), a compact disk-recordable (CD-R), a memory card, and the ROM may be used as the computer readable recording medium. Further, the computer program according to the present invention may be provided by an external apparatus via a communication interface and executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-190376 filed Sep. 1, 2011, which is hereby incorporated by reference herein in its entirety.

What is claimed is:

1. A communication apparatus comprising:
   a transmission unit that transmits image data to an external display device;
   a communication unit that transmits a command to the external display device; and
   a control unit that causes, based on whether an external apparatus connected to the external display device is transmitting image data to the external display device, the communication unit to transmit a first command to the external apparatus if the external apparatus is a predetermined device, wherein the predetermined device is a device which a predetermined logical address is assigned to, wherein the predetermined logical address is a logical address relating to a device type of the communication apparatus, wherein the first command is used for causing the external apparatus to release the predetermined logical address, wherein the control unit causes, after the first command is transmitted to the external apparatus, the communication unit to transmit a second command to the external display device by using the predetermined logical address which is released from the external apparatus,
   wherein the second command is used for causing the external display device to display image data to be transmitted by the transmission unit to the external display device.

2. The communication apparatus according to claim 1, wherein the control unit causes, based on whether a manufacturer name of the external apparatus is different from a manufacturer name of the communication apparatus, the communication unit to transmit the first command to the external apparatus.

3. The communication apparatus according to claim 1, wherein the predetermined logical address is related to a device type of a reproduction apparatus.

4. The communication apparatus according to claim 1, wherein the predetermined logical address is related to a device type of a recording apparatus.

5. The communication apparatus according to claim 1, wherein the control unit causes the communication unit to transmit the first command to the external apparatus if the external apparatus is not transmitting image data to the external display device.

6. The communication apparatus according to claim 1, wherein the control unit causes the communication unit to transmit the first command to the external apparatus if a manufacturer name of the external apparatus is not different from a manufacturer name of the communication apparatus.

7. The communication apparatus according to claim 1, wherein the second command includes a command used for turning the external display device on.

8. The communication apparatus according to claim 1, wherein the second command includes a command used for selecting image data to be transmitted by the transmission unit to the external display device as image data to be displayed by the external display device.

9. The communication apparatus according to claim 1, wherein the control unit determines whether to release the predetermined logical address in response to a reception of the first command from the external apparatus after the predetermined logical address is acquired.

10. The communication apparatus according to claim 9, wherein the control unit determines not to release the predetermined logical address if the transmission unit is transmitting image data to the external display device.

11. A method controlling a communication apparatus comprising:
    transmitting, based on whether an external apparatus connected to an external display device is transmitting image data to the external display device, a first command to the external apparatus if the external apparatus is a predetermined device, wherein the predetermined device is a device which a predetermined logical address is assigned to, wherein the predetermined logical address is a logical address relating to a device type of the communication apparatus, wherein the first command is used for causing the external apparatus to release the predetermined logical address; and
    transmitting a second command to the external display device by using the predetermined logical address which is released from the external apparatus after the first command is transmitted to the external apparatus, wherein the second command is used for causing the external display device to display image data to be transmitted to the external display device.

12. The method according to claim 11, further comprising transmitting the first command to the external apparatus if the external apparatus is not transmitting image data to the external display device.

13. The method according to claim 11, wherein the second command includes a command used for turning the external display device on.

14. The method according to claim 11, wherein the second command includes a command used for selecting image data to be transmitted to the external display device as image data to be displayed by the external display device.

15. A non-transitory computer readable recording medium storing a program that causes a computer to perform a method for controlling a communication apparatus, the method comprising:
    transmitting, based on whether an external apparatus connected to an external display device is transmitting image data to the external display device, a first command to the external apparatus if the external apparatus is a predetermined device, wherein the predetermined device is a device which a predetermined logical address is assigned to, wherein the predetermined device is a logical address relating to a device type of the communication apparatus, wherein the first command is used for causing the external apparatus to release the predetermined logical address; and
    transmitting a second command to the external display device by using the predetermined logical address which is released from the external apparatus after the first command is transmitted to the external apparatus, wherein the second command is used for causing the external display device to display image data to be transmitted to the external display device.

* * * * *